United States Patent
Arai et al.

(10) Patent No.: US 7,846,364 B2
(45) Date of Patent: Dec. 7, 2010

(54) METHOD AND APPARATUS FOR MANUFACTURING COMPOSITE PRODUCT

(75) Inventors: Tsuyoshi Arai, Kariya (JP); Naoki Hiraiwa, Toyokawa (JP); Hiroshi Tanimura, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1075 days.

(21) Appl. No.: 11/184,859

(22) Filed: Jul. 20, 2005

(65) Prior Publication Data

US 2006/0027947 A1 Feb. 9, 2006

(30) Foreign Application Priority Data

Aug. 4, 2004 (JP) ............................ 2004-227983

(51) Int. Cl.
*B29C 45/14* (2006.01)
(52) U.S. Cl. ................... 264/242; 264/294; 264/297.8; 425/572; 425/573
(58) Field of Classification Search ................. 264/242, 264/294, 297.8; 425/572, 573
See application file for complete search history.

(56) References Cited

U.S. PATENT DOCUMENTS

| 5,304,336 | A | 4/1994 | Karlsson et al. |
| 5,421,718 | A | 6/1995 | Karlsson et al. |
| 6,626,421 | B2 * | 9/2003 | Torii et al. ................... 251/305 |
| 6,667,002 | B1 * | 12/2003 | Meyer ......................... 264/138 |
| 2002/0149135 | A1 * | 10/2002 | Choi et al. ............... 264/328.8 |
| 2003/0024576 | A1 * | 2/2003 | Schaefer et al. ............. 137/554 |
| 2004/0031945 | A1 * | 2/2004 | Krimmer et al. ............ 251/308 |
| 2005/0022781 | A1 | 2/2005 | Arai et al. |
| 2006/0138697 | A1 * | 6/2006 | Lorenz et al. ............... 264/242 |

FOREIGN PATENT DOCUMENTS

JP 2000210983 A * 8/2000

* cited by examiner

*Primary Examiner*—Philip C Tucker
*Assistant Examiner*—Amjad Abhraham
(74) *Attorney, Agent, or Firm*—Nixon & Vanderhye PC (57) ABSTRACT

An apparatus manufactures a composite product having a first molding product and a second molding product. The second molding product is supported by the first molding product through a supporting member. The apparatus includes a molding die, and an injection molding machine supplying a mold material into the molding die. The molding die includes a first cavity for molding the first molding product, a second cavity for molding the second molding product, a first passage for introducing a molding material into the first cavity from the injection molding machine, and a second passage for introducing a molding material in the first cavity into the second cavity.

4 Claims, 9 Drawing Sheets

METHOD AND APPARATUS FOR MANUFACTURING COMPOSITE PRODUCT

CROSS REFERENCE TO RELATED APPLICATIONS

This application is based on and incorporates herein by reference Japanese Patent Application No. 2004-227983 filed on Aug. 4, 2004, the disclosure of which is incorporated herein by reference.

FIELD OF THE INVENTION

The present invention relates to a method and apparatus for manufacturing a product which has a first molding part and a second molding part, the second molding part being supported in the first molding part via a supporting member.

BACKGROUND OF THE INVENTION

A throttle apparatus is known as a composite product. The throttle apparatus includes a throttle body as the first molding part and a throttle valve as the second molding part. The throttle body supports the throttle valve via a throttle shaft.

JP-5-141540A (U.S. Pat. No. 5,304,336, U.S. Pat. No. 5,421,718) shows a manufacturing method of a throttle apparatus, in which after the first molding part is molded, the second molding part is molded using the first molding part as a part of molding die. The fist molding part is held by the molding die to mold the second molding part. After cooling and solidifying the products, the first and the second molding parts may be freely deformed so that an accuracy of the product is deteriorated. Especially, in molding the throttle valve by the above method, a clearance between the throttle valve and the throttle body is hardly maintained at a predetermined value. Thus, when the throttle valve is positioned at a full close position, an amount of air passing through the throttle valve disperses in each product.

SUMMARY OF THE INVENTION

The present invention is made in view of the foregoing matter and it is an object of the present invention to provide a method and apparatus which is capable of precisely manufacturing a composite product in low productive cost.

According to the present invention, the resin is introduced into the first cavity for molding a first molding product, and then the resin in the first cavity is introduced into the second cavity for molding a second molding product. Therefore, the filling pressure in the second cavity is brought to be close to the filling pressure in the first cavity without respect to a volume difference between the first and second cavities and an abrasion of the passages connecting them. A difference between a resin shrink amount of the first molding product and the second molding product can be restricted.

Furthermore, the melted resin in the first cavity is introduced into the second cavity while the melted resin is injected into the first cavity, so that the first molding product and the second molding product can be molded at substantially the same time.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

An embodiment of the present invention will be described hereinafter with reference to the drawings.

First Embodiment

Figure 2:
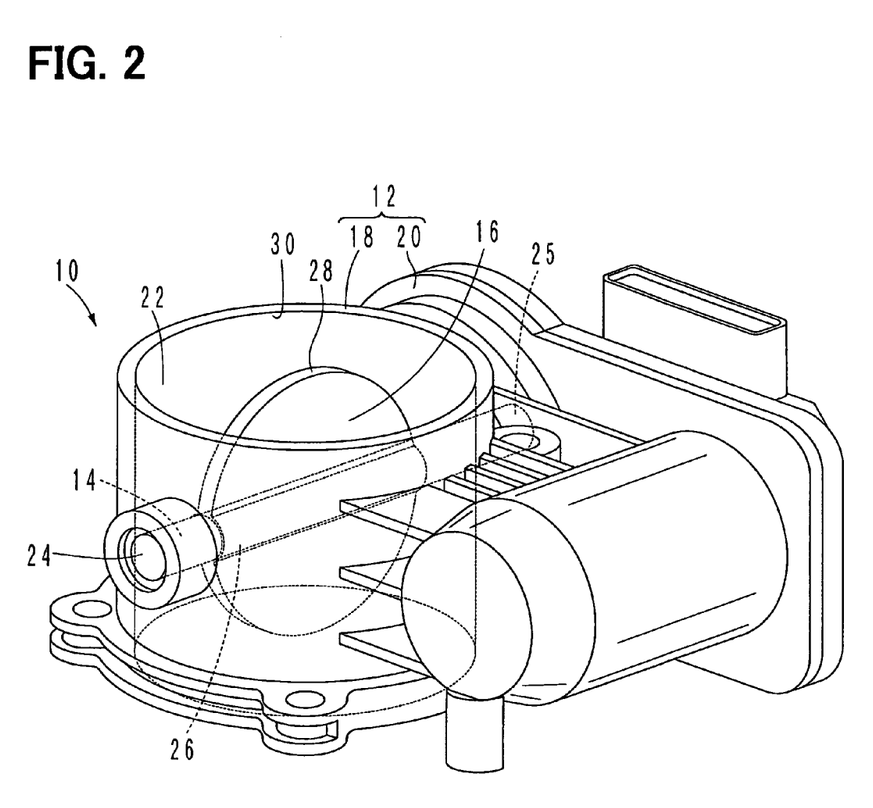
FIG. 2 is a perspective view of a throttle apparatus according to the first and a second embodiment.

FIG. 2 schematically shows a throttle apparatus 10 as a composite product according to a first embodiment of the present invention. The throttle apparatus 10 is mounted on a vehicle (not shown). Fresh air is introduced into an internal combustion engine through the throttle apparatus 10. A throttle valve 16 adjusts quantity of the fresh air introduced into the engine.

Figure 3:
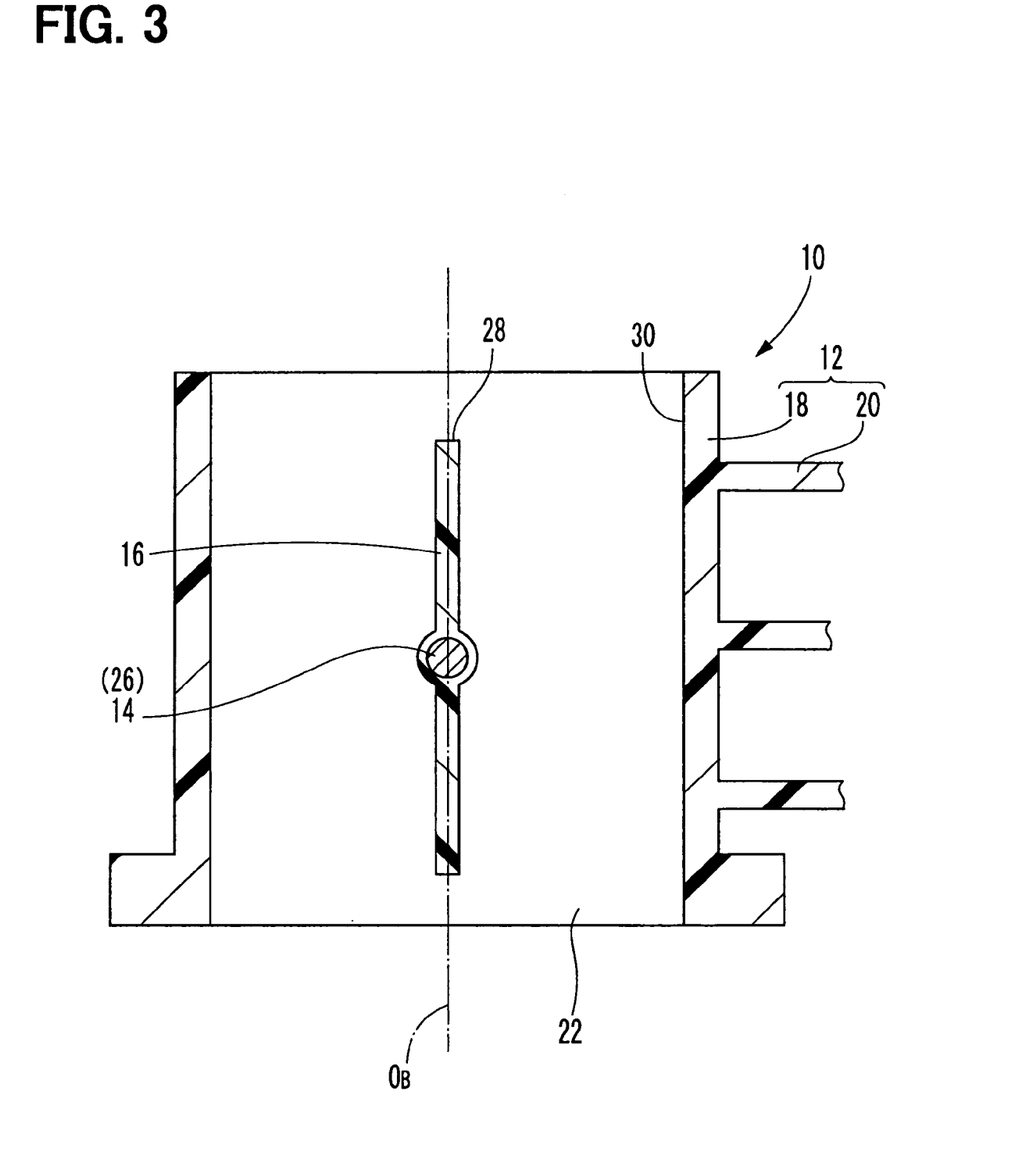
FIG. 3 is a cross-sectional view of the throttle apparatus according to the first and the second embodiment.

Referring to FIGS. 2 and 3, a structure of the throttle apparatus 10 will be described more in detail. The throttle apparatus 10 includes a throttle body 12 as a first molding part, a throttle shaft 14 as a supporting member, a throttle valve 16 as a second molding part, and a driving unit (not shown). The throttle body 12 includes a cylindrical body 18 and a case 20 accommodating the driving unit. The body 18 is made of resin material and forms an intake air passage 22 therein. The body 18 supports both ends 24, 25 of a throttle shaft 14 made of metallic material in such a manner that the throttle shaft 14 can rotate in normal direction and reverse direction. The throttle shaft 14 comes across a center axis $O_B$ of the body 18 in a right angle. A middle portion 26 of the throttle shaft 14 is positioned in the intake air passage 22 and is insert molded in the throttle valve 16 made of resin material in a round shape. Thus, the throttle valve 16 integrally rotates with the throttle shaft 14. A clearance formed between an outer periphery 28 of the throttle valve 16 and an inner bore wall 30 of body 18 are varied according to a rotation of the throttle shaft 14 in order to adjust the quantity of fresh air introduced into the engine. When the throttle valve 16 is parallel to the center axis $O_B$ as shown in FIG. 3, the intake air passage 22 is fully opened. A driving unit driving the throttle shaft 14 includes an electric motor (not shown) and a gear mechanism (not shown), and is accommodated in the case 20.

Figure 1:
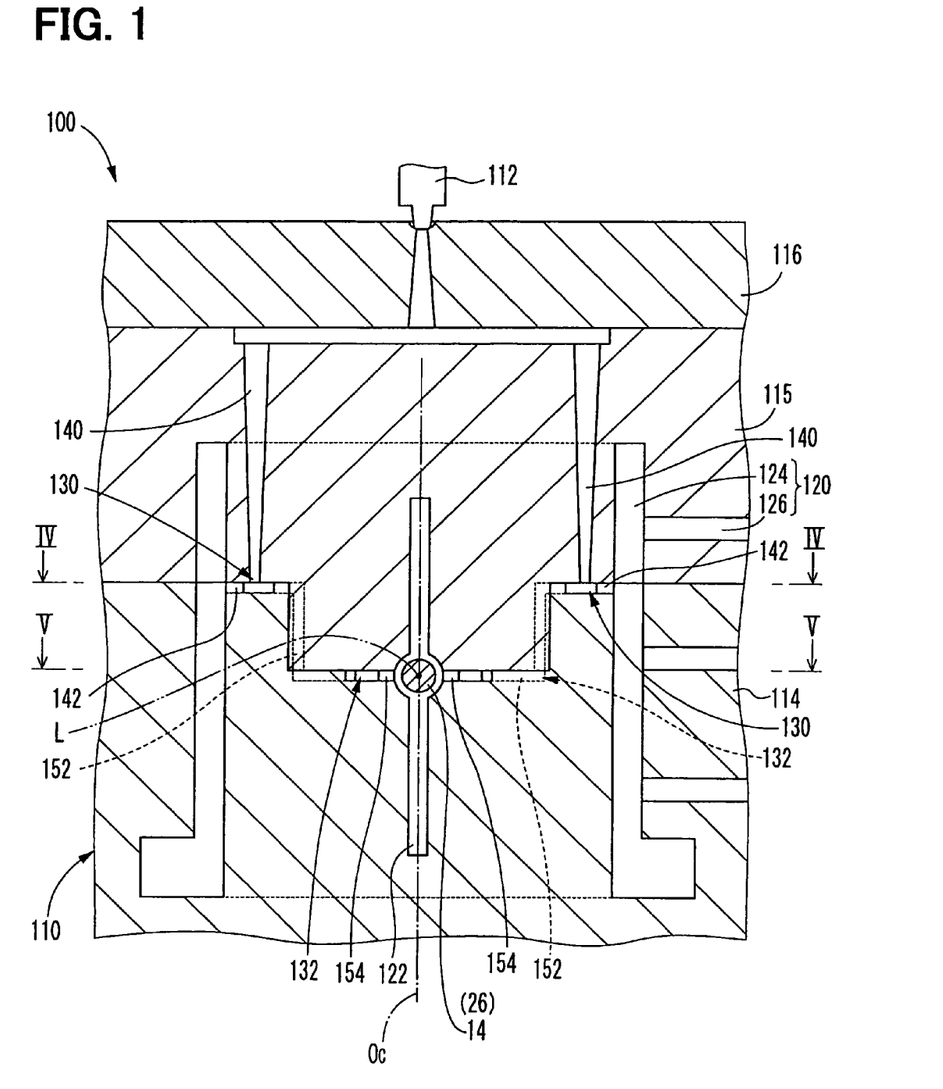
FIG. 1 is a cross-sectional view of a resin molding apparatus according to a first embodiment of the present invention.
Figure 4:
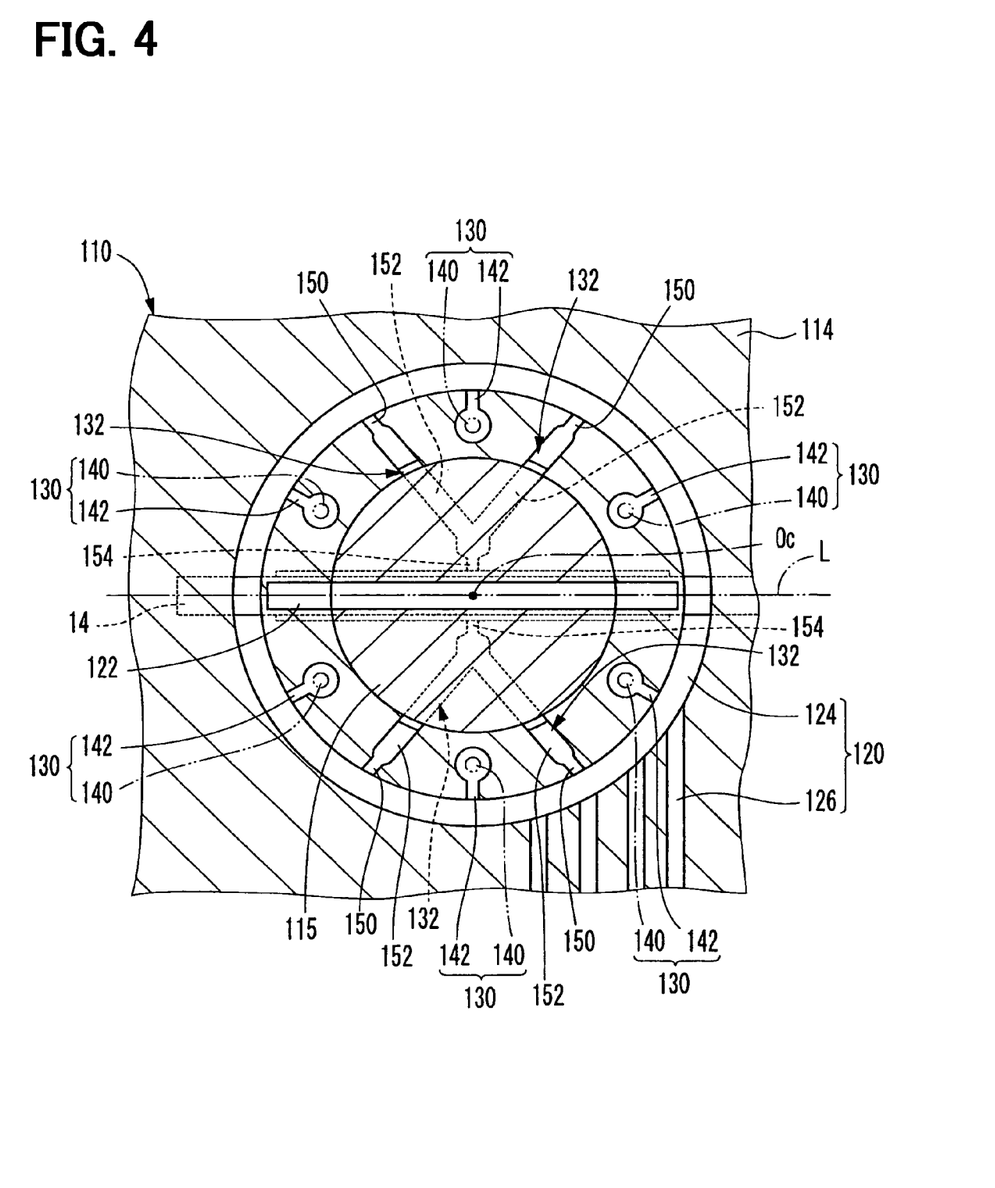
FIG. 4 is a cross-sectional view taken along a line IV-IV in FIG. 1.
Figure 5:
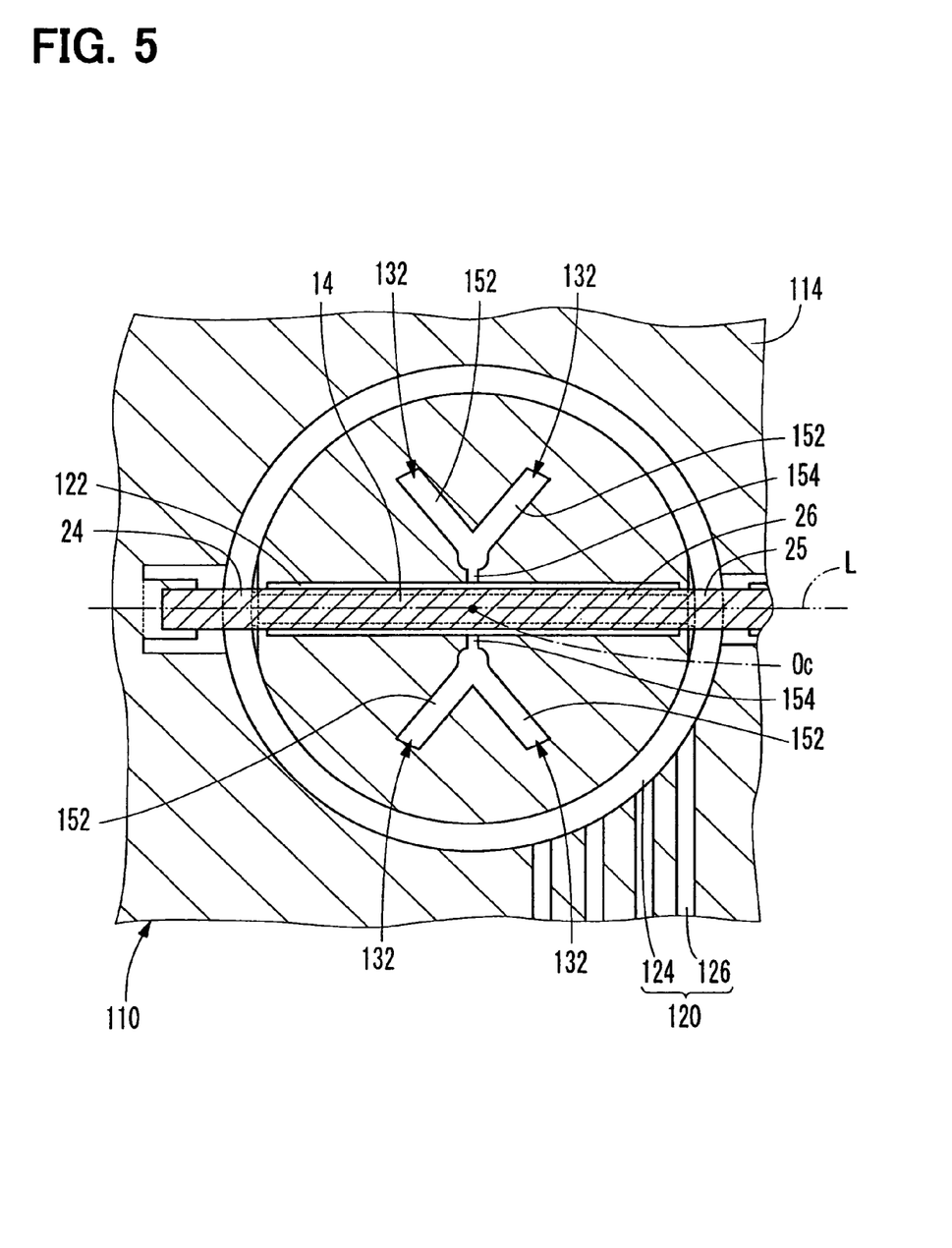
FIG. 5 is a cross-sectional view taken along a line V-V in FIG. 1.

Referring to FIGS. 1, 4, and 5, a structure of resin molding apparatus 100 is described hereinafter.

The resin molding apparatus 100 includes molding die 110, an injection-molding machine 112 injecting a melted resin into the molding die 110, and a clamping mechanism (not shown) clamping/opening the molding die 110. The molding die 110 includes a plurality of die plates 114, 115, 116 which form a first cavity 120, a second cavity 122, a first passage 130, and a second passage 132. It is noted that the molding die 110 is clamped in the following description.

The first cavity 120 includes a body molding portion 124 and a case-molding portion 126. The body-molding portion 124 has a shape corresponding to the cylindrical body 18, and the case-molding portion 126 has a shape corresponding to the case 20. The throttle shaft 14 is clamped between the die plates 114, 115. Both end portions 24, 25 of the throttle shaft 14 is positioned in at least the body molding portion 124 of the first cavity 120. The end portions 24, 25 are referred to as a first portion of the throttle shaft.

The second cavity 122 is arranged inside of the body-molding portion 124 of the first cavity 120. The second cavity 122 has a shape corresponding to the throttle valve 16, and is fluidly connected to the first cavity 120 through a plurality of second passages 132. The second cavity 122 is arranged in such a manner that the throttle valve 16 is fully opened relative to the body 18. That is, the second cavity 122 is positioned on a center axis $O_C$ of the body-molding portion 124. The center axis $O_C$ of the body-molding portion 124 is consistent with the center axis $O_B$. The middle portion 26 of the throttle shaft 14 is positioned in the second cavity 122. The middle portion 26 is referred to as a second portion of the throttle shaft 14. In FIGS. 4 and 5, a chain double-dashed line "L" represents a center axis of the throttle shaft 14.

The first passage 130 has six passages which are provided between the body molding portion 124 of the first cavity 120 and the second cavity 122. Three of first passages 130 are respectively disposed at both regions relative to the line "L". Each of the first passages 130 is arranged in such a manner as to be symmetric with respect to the center axis $O_C$. Each of the first passages 130 includes a runner portion 140 and a gate portion 142 as a first inlet.

The injection molding machine 112 supplies melted resin into the runner portion 140. An upstream portion of the gate portion 142 is fluidly connected to the runner portion 140, and a downstream portion of the gate portion 142 is fluidly connected to the body-molding portion 124. The melted resin injected into the runner portion 140 flows into the first cavity 120 through the gate portion 142.

The second passage 132 has four passages. Two of the second passages 132 are respectively provided between the body molding portion 124 and the second cavity 122 at both sides relative to the line "L". Each of the second passages 132 is arranged in such a manner as to be symmetric with respect to the center axis O.sub.C. That is, two pairs of second passages 132 are respectively provided on both sides relative to the center axis O.sub.C. Each of the second passages 132 has an overflow portion 150 as an outlet and a runner portion 152. An upstream portion of the overflow portion 150 is fluidly connected to the body-molding portion 124 between two adjacent runner portions 140. A down stream portion of the overflow portion 150 is fluidly connected to the runner portion 152. The melted resin injected into the first cavity 120 flows into the runner portion 152 through the overflow portion 150.

The second passages 132 in the same region have a common gate portion 154 as a first inlet. The downstream portion of runner portion 152 is fluidly connected to the gate portion 154. Each of the gate portions 154 is connected with the second cavity 122. The melted resin introduced into the runner portion 152 flows into the second cavity 122.

Figure 6:
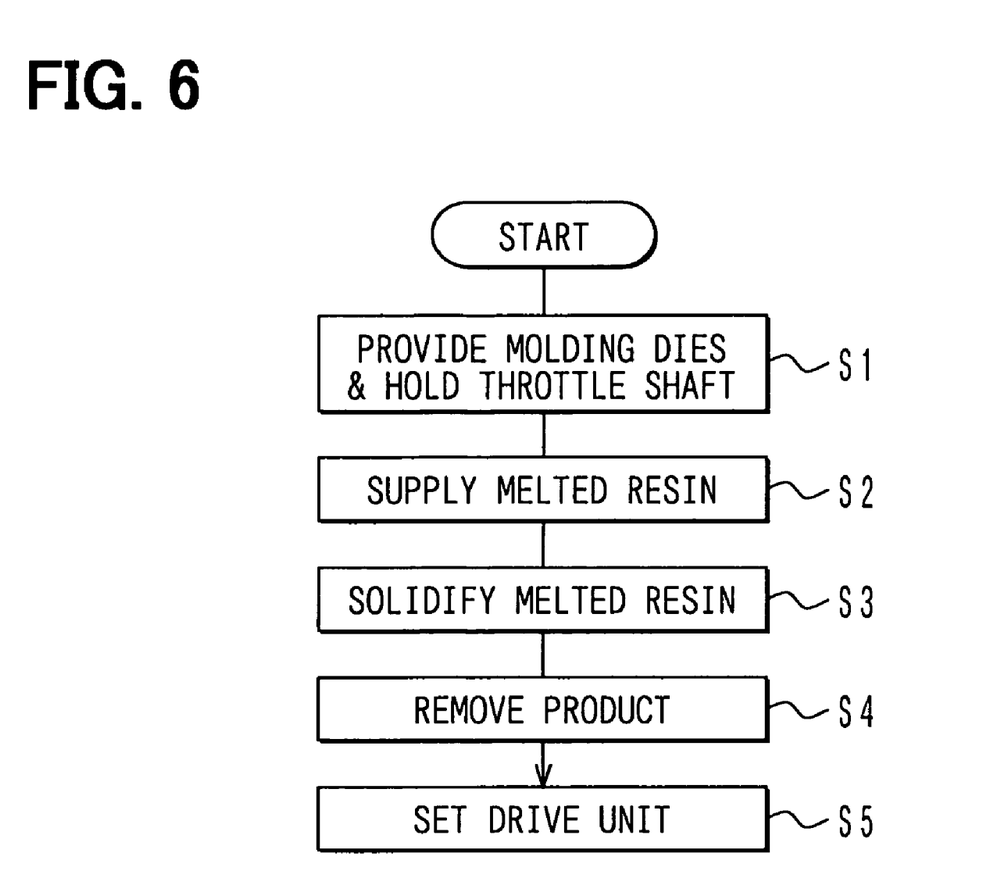
FIG. 6 is a flowchart showing a manufacturing method of the throttle apparatus according to the first and second embodiment.

The method for manufacturing the throttle apparatus 10 is described hereinafter based on a flowchart shown in FIG. 6.

In step S1, the molding die 100 is provided to form the first and the second cavities 120, 122, and the first and the second passages 130, 132 therein by clamping the die plates 114, 115, 116. At this moment, the throttle shaft 14 is supported between the die plates 114 and 115. The first cavity 120 accommodates both end portions 24, 25 of the throttle shaft 14, and the second cavity 122 accommodates the middle portion 26 of the throttle shaft 14. In the first embodiment, step S1 corresponds to providing step and accommodating step (disposing step of throttle shaft).

In step S2, the molding die 110 is clamped to inject melted resin thereinto by the injection-molding machine 112. The injected melted resin flows through the runner portion 140 of the first passage 130 and the gate portion 142, and then flows into the first cavity 120. When the first cavity 120 is filled with the melted resin to some extent, the melted resin in the first cavity flows into the runner portion 152 of the second passage 132 through the overflow passage 150 of the second passage 132. Then, the melted resin in the runner portion 152 flows into the second cavity 122 through the gate portion 154 of the second passage 132.

In step S3, cooling and solidifying of the resin is conducted to obtain a resin product that includes throttle body 12, the throttle valve 16, and the throttle shaft 14. The throttle shaft 14 is insert molded. In the present embodiment, step S2 and step S3 correspond to molding step.

In step S4, the molding die is unclamped to remove the product. In step S5, a driving unit (not shown) is set in the case 20, and the throttle apparatus 10 is completed.

According to the first embodiment, the resin is introduced into the first cavity 120 through the first passage 130, and then the resin in the first cavity 120 is introduced into the second cavity 122 through the second passage 132. Therefore, the filling pressure in the second cavity 122 is brought to be close to the filling pressure in the first cavity 120 without respect to a volume difference between the first and second cavities 120, 122 and an abrasion of the passages 130, 132 due to reinforcing materials in the melted resin. A difference between a resin shrink amount of the throttle body 12 and the throttle valve 16 can be restricted.

Furthermore, according to the first embodiment, the melted resin in the first cavity 120 is introduced into the second cavity 122 while the melted resin is injected into the first cavity 120, so that the throttle body 12 and the throttle valve 16 can be molded at substantially the same time.

As described above, according to the first embodiment, the resin-shrink-difference between the throttle body 12 and the throttle valve 16 is reduced to enhance the product accuracy. That is, in case of that the throttle valve 16 is fully closed, the clearance between the throttle valve 16 and the throttle body 12 is maintained at a predetermined desirable value. Since the throttle valve 16 and the throttle body 12 are molded at substantially the same time, the manufacturing time is decreased.

Second Embodiment

Figure 7:
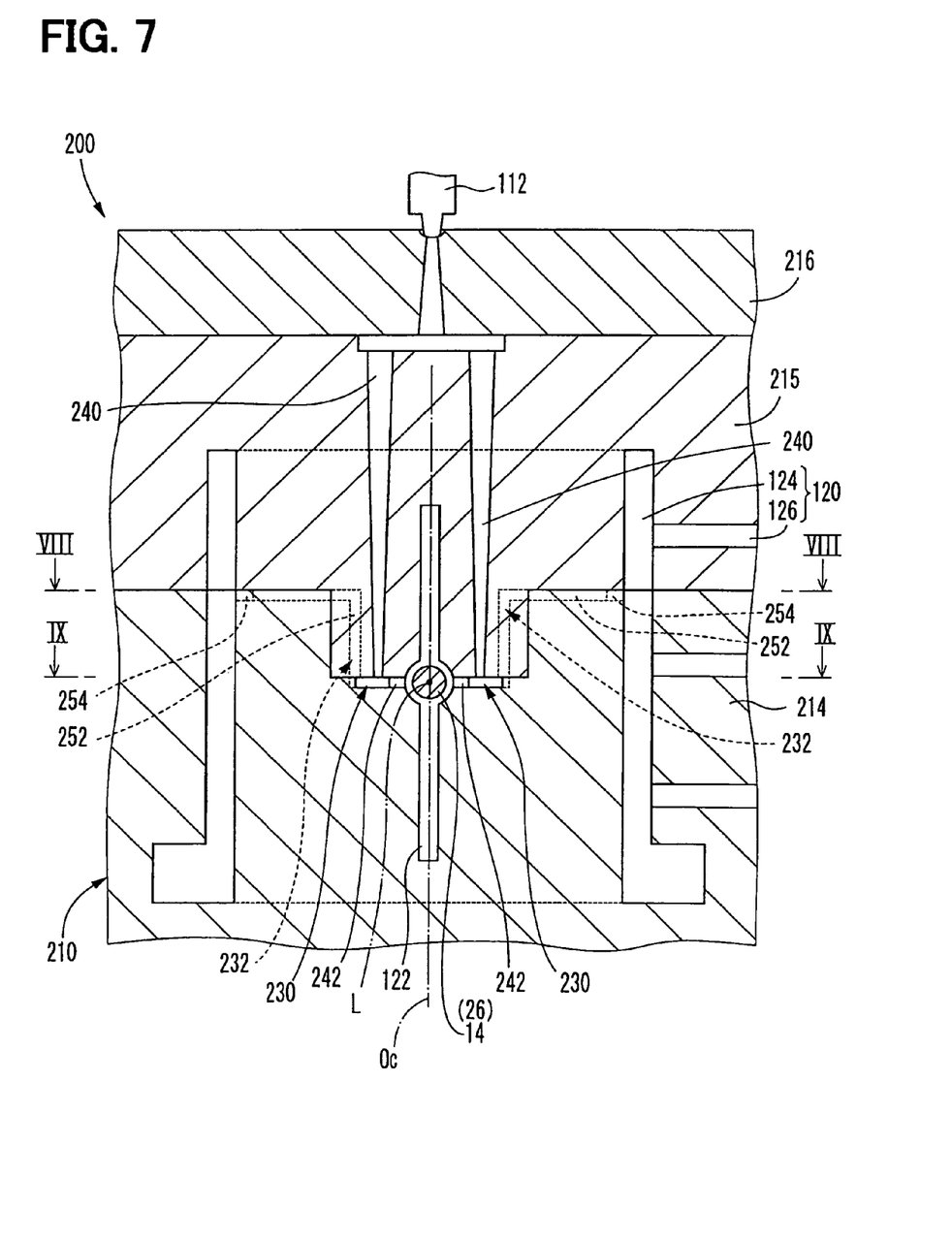
FIG. 7 is a cross-sectional view of a resin molding apparatus according to the second embodiment of the present invention.
Figure 8:
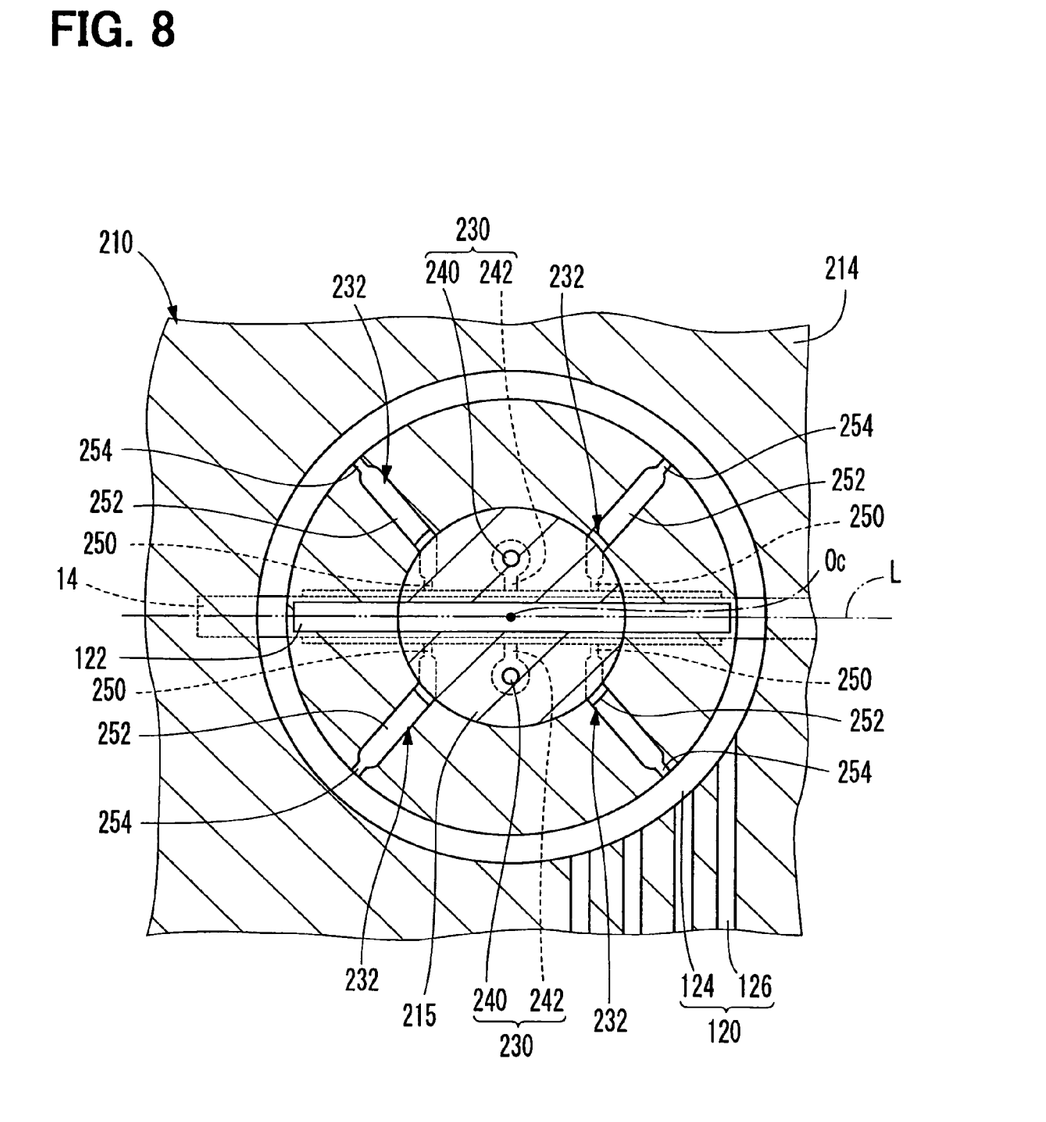
FIG. 8 is a cross-sectional view taken along a line VIII-VIII in FIG. 7.
Figure 9:
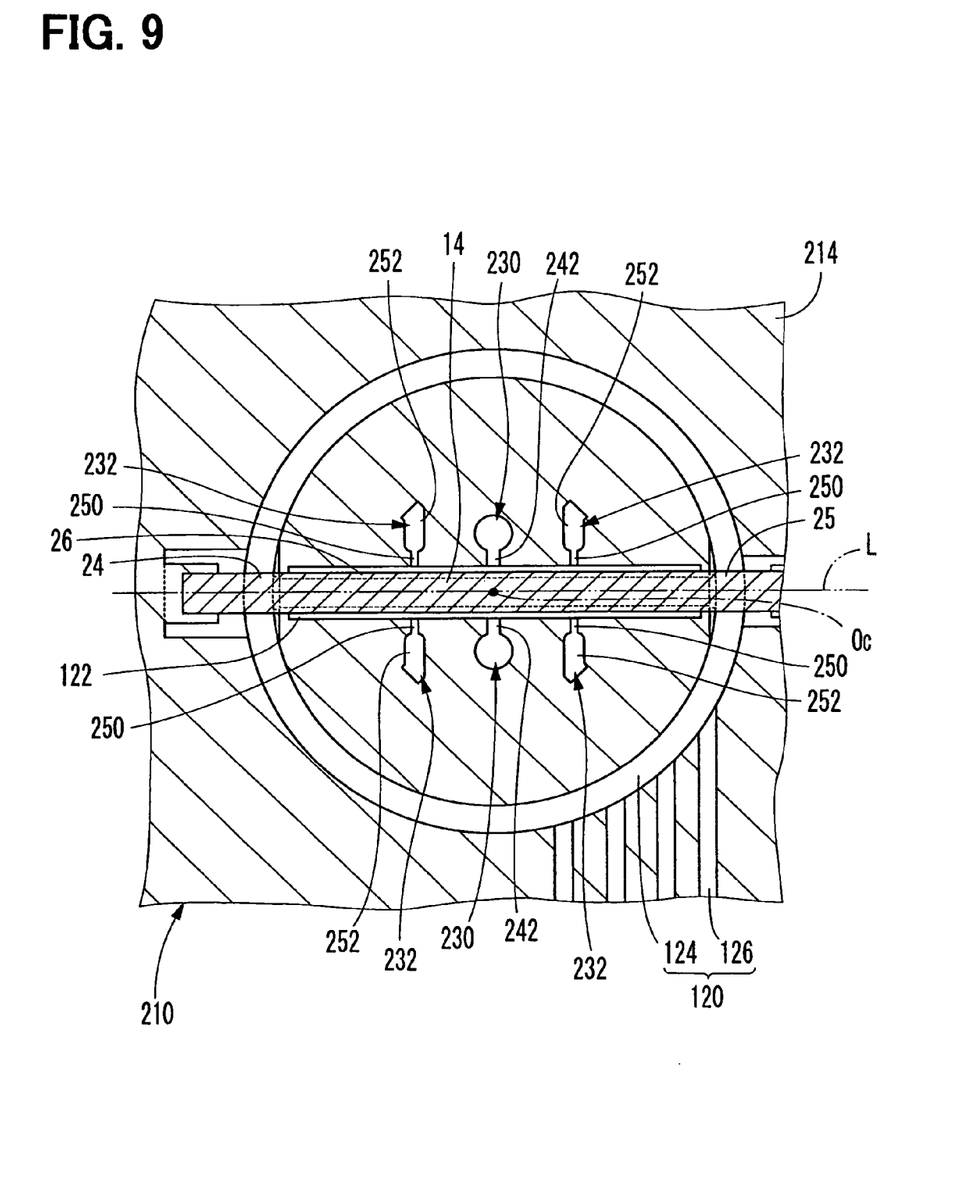
FIG. 9 is a cross-sectional view taken along a line IX-IX in FIG. 7.

In the second embodiment, the same parts and components as those in the first embodiment are indicated with the same reference numerals and the same descriptions will not be reiterated. FIGS. 7 to 9 shows a structure of resin molding apparatus 200 according to the second embodiment.

A molding die 210 includes a first passage 230 and a second passage 232 which are formed by clamping die plates 214, 215, 216.

The first passage 210 is provided between the body-molding portion 124 of the first cavity 122 and the second cavity 122 one by one at both sides relative to the line "L". Each of the first passages 230 is arranged in such a manner as to be symmetric with respect to the center axis $O_C$. The first passage 230 includes a runner portion 240 and a gate portion 242 as a first inlet. The runner portion 240 is fluidly connected to the injection-molding machine 112. The gate portion 242 communicates to the runner portion 240 at the upstream portion thereof and communicates to the second cavity 122 at the downstream portion thereof. The melted resin introduced into the runner portion 240 flows into the second cavity 122 through the gate portion 242.

The second passage 232 is provided between the body molding portion 124 and the second cavity 122 two by two at both sides relative to the line "L". Each of the second passages 232 is arranged in such a manner as to be symmetric with respect to the center axis $O_C$. Each of the second passages 232 includes an overflow portion 250 as an inlet, a runner portion 252, and a gate portion 254 as an outlet. The overflow portion 250 communicates to the second cavity 122. The overflow portion 250 communicates also to the body-molding portion 124 through the runner portion 252 and the gate portion 254. The melted resin in the second cavity 122 flows into the runner portion 252 through the overflow portion 250, and then flows into the first cavity 120 through the gate portion 254.

According to the second embodiment, steps S1 to S2 are conducted as in the first embodiment. It is noted that the injected resin from the injection-molding machine 112 flows into the runner portion 240 of the first passage 230, and then flows into the second cavity 122 through the gate portion 242 of the first passage 230 in step S2. When the second cavity 122 is filled with the melted resin to some extent, the melted resin in the second cavity 122 flows into the runner portion 252 of the second passage 232 through the overflow portion 250 of the second passage 232. The melted resin in the runner portion 252 flows into the first cavity 120 through the gate portion 254 of the second passage 232.

That is, while the resin is introduced into the second cavity 122 through the first passage 230, the resin in the second cavity 122 is introduced into the first cavity 120 through the second passage 232. Thus, also in the second embodiment, the same effect can be achieved as the first embodiment.

The resin material can be replaced by metallic material in the above embodiments. The present invention can be applied to the other composite products other than throttle apparatus.

What is claimed is:

1. A method for manufacturing a composite product having a first molded part and a second molded part, the second molded part being supported by the first molded part through a supporting shaft, the method comprising:
   providing a molding die having a first cavity for molding the first molded part and an independently formed second cavity for molding the second molded part;
   disposing a first portion of the supporting shaft in the first cavity and a second portion of the supporting shaft in the second cavity;
   introducing a molding material from an injection-molding machine into the first cavity through plural first passages connecting the injection-molding machine with the first cavity;
   introducing the molding material in the first cavity into the second cavity through plural second passages connecting the first cavity with the second cavity at a position separate and apart from said first portion of the supporting shaft;
   solidifying the molding material introduced into the first cavity and the second cavity; and
   removing solidified first and second molded parts from the first and the second cavities, wherein
   the second molded part is disposed within the first molded part which has a cylindrical shape,
   the first cavity includes a cylindrical body molding portion,
   the second cavity is provided on a center axis of the cylindrical body molding portion,
   the molding material is introduced into the first cavity through plural first passages which are symmetrically formed with respect to a center axis of the cylindrical body molding portion, and
   the molding material in the first cavity is introduced into the second cavity through plural second passages which are symmetrically formed with respect to a center axis of the supporting shaft.

2. The method for manufacturing a composite product according to claim 1, wherein:
   the first molded part is a throttle body of a throttle apparatus, the second molded part is a throttle valve, and the supporting shaft is a throttle shaft.

3. A method for manufacturing a composite product having a first molded part and a second molded part, the second molded part being supported by the first molded part through a supporting member, the method comprising:
   providing a molding die having a first cavity for molding the first molded part and an independently formed second cavity for molding the second molded part;
   disposing a first portion of the supporting shaft in the first cavity and a second portion of the supporting shaft in the second cavity;
   introducing a molding material from an injection-molding machine into the second cavity through plural first passages connecting the injection-molding machine with the second cavity;
   introducing the molding material in the second cavity into the first cavity through plural second passages connecting the second cavity with the first cavity at positions separate and apart from said first portion of the supporting shaft;
   solidifying the molding material introduced into the first cavity and the second cavity; and
   removing solidified first and second molded parts from the first and the second cavities, wherein
   the second molded part is disposed within the first molded part which has a cylindrical shape,
   the first cavity includes a cylindrical body molding portion,
   the second cavity is provided on a center axis of the cylindrical body molding portion,
   the molding material is introduced into the second cavity through plural first passages which are symmetrically formed with respect to a center axis of the supporting shaft, and
   the molding material in the second cavity is introduced into the first cavity through plural first passages which are symmetrically formed with respect to a center axis of the cylindrical body portion.

4. The method for manufacturing a composite product according to claim 3 wherein:
   the first molded part is a throttle body of a throttle apparatus, the second molded part is a throttle valve, and the supporting shaft is a throttle shaft.

* * * * *